A. W. BRINKERHOFF.
Tools for Molding Inkstands.
No. 145,619.          Patented Dec. 16, 1873.
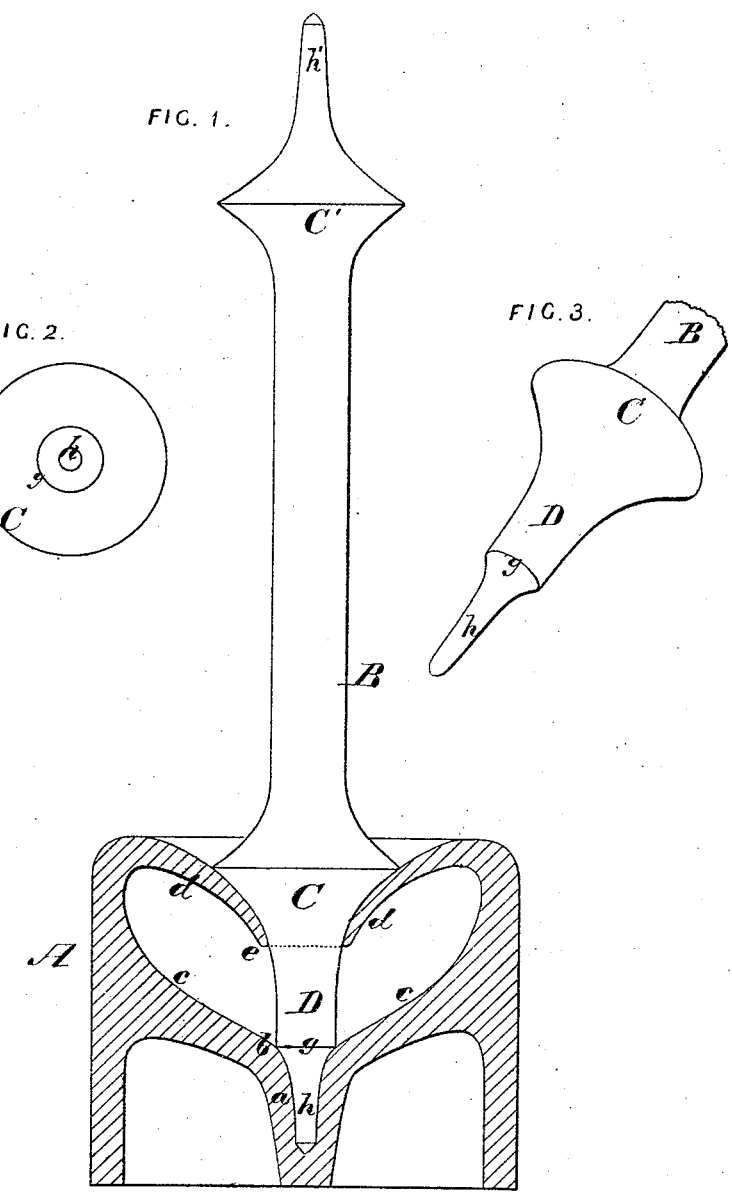

UNITED STATES PATENT OFFICE.

ALEXANDER W. BRINKERHOFF, OF UPPER SANDUSKY, OHIO.

IMPROVEMENT IN TOOLS FOR MOLDING INKSTANDS.

Specification forming part of Letters Patent No. 145,619, dated December 16, 1873; application filed November 15, 1873.

*To all whom it may concern:*

Be it known that I, ALEXANDER W. BRINKERHOFF, of Upper Sandusky, in the county of Wyandot and State of Ohio, have invented a new and valuable Improvement in Tools for use in Manufacturing Inkstands; and I do hereby declare that the following is a full, clear, and exact description of the construction and operation of the same, reference being had to the annexed drawings making a part of this specification, and to the letters and figures of reference marked thereon.

Figure 1 of the drawings is a representation of the manner of applying my tool to the manufacture of inkstands. Figs. 2 and 3 are detail views of my tool.

The object of this invention is to facilitate the manufacture of the inkstands for which Letters Patent of the United States were granted to me, bearing date on the 7th day of May, 1872, and also to be able to make the stands more perfect and uniform. My invention consists in a molding or forming tool which is constructed with concave tapered enlargements and cylindrical stems, adapted to form the ink-well, the cover of the stand, and the circular mouth which is through the center of the cover, and to leave these parts positively true and in proper relation with each other, as will be hereinafter explained.

The following is a description of the tool and the mode of using it:

In the annexed drawings, A represents the inkstand which I produce by the improved tool. B represents the handle or stock of the tool, on one end of which a conical enlargement, C, is formed. The sides of this enlargement are concave, and terminate in a cylindrical stem, D. On the end of this stem D is a circular concave shoulder, $g$, which terminates in a cylindrical punch, $h$. On the opposite end of the handle or stock a conical enlargement, C', is formed, terminating in a punch, $h'$.

The inkstand A has certain peculiarities of construction, which have been fully set forth in my Letters Patent above referred to; but for the purpose of more fully explaining my present invention, I will again briefly describe the inkstand: In the center of the bottom of the stand is an ink-well, $a$, at the upper end of which is a circular shoulder, $b$, which is continuous, with an upwardly-flaring bottom, $c$, and an upwardly-flaring cover, $d$. Through the center of the cover $d$ is a circular mouth, $e$, the center of which should coincide with the center of the ink-well.

In the manufacture of these inkstands an iron mold is used. Into this mold soft glass is put. A plunger is then forced centrally into the mold, having on its lower end a point to form the well $a$. When the plunger is withdrawn, the glass being hot and heavy about the shoulder $b$ of the well, it has a tendency to run and close the well. The tool above described is at once put into the closing well and forced down to the shoulder $g$ of the iron, which reopens and chills the glass and leaves the well permanent. The point $h$ is sufficiently long to form the well, and its shoulder, coming in contact with the glass, prevents the point from penetrating too deeply. If, however, it is desired to make a hole entirely through the leg, the point $h$ will be made sufficiently long to secure this end.

The glass is first discharged from the mold with the upper part in shape like a tumbler, when the top is drawn together in an arching form and gradually pressed down, by means of the part C, until the shoulder $g$ strikes the shoulder $b$ at the top of the well $a$. The point $h$, entering the chilled glass surrounding the well, will guide the tool, and, at the same time, center it, so that the center of the mouth $e$ will exactly coincide with the center of the well.

If desired, the parts C' $h'$ may be used for opening the well before the cover $d$ is formed, and the parts C D $g$ $h$ used to complete the work.

What I claim as new, and desire to secure by Letters Patent, is—

The former or molding-tool consisting of the concave cone C, a circular shoulder, $g$, and a point, $h$, formed on a handle or stock, B, for the purposes described.

In testimony that I claim the above I have hereunto subscribed my name in the presence of two witnesses.

ALEXANDER W. BRINKERHOFF.

Witnesses:
   D. D. HARE,
   WILL. R. SNYDER.